Feb. 28, 1933.  W. C. GEER  1,899,088
BEAD FOR PNEUMATIC TIRE CASINGS AND METHOD OF MAKING THE SAME
Filed June 27, 1925
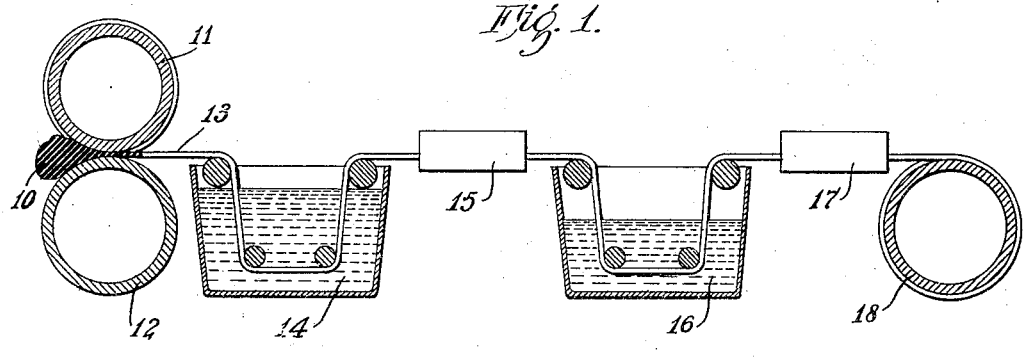
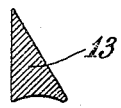
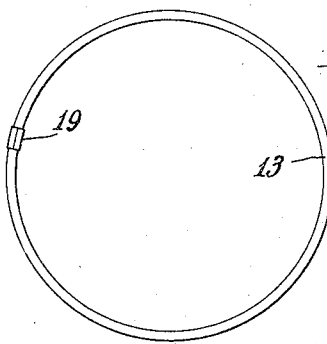
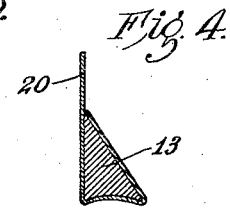
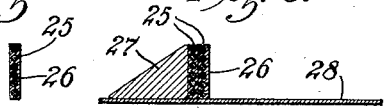
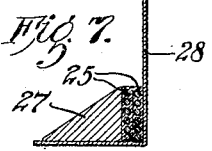
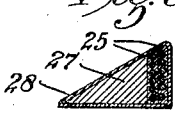
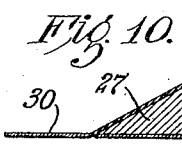
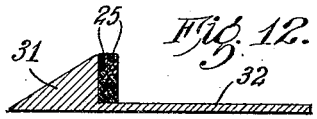
Inventor
William C. Geer,
By Pierson, Eakin & Avery
Attys.

Patented Feb. 28, 1933

1,899,088

UNITED STATES PATENT OFFICE

WILLIAM C. GEER, OF AKRON, OHIO, ASSIGNOR TO THE B. F. GOODRICH COMPANY, OF NEW YORK, N. Y., A CORPORATION OF NEW YORK

BEAD FOR PNEUMATIC TIRE CASINGS AND METHOD OF MAKING THE SAME

Application filed June 27, 1925. Serial No. 39,963.

This invention relates to bead rings employed in the manufacture of pneumatic tire casings and it has for an object to provide an improved method of constructing a bead, one which shall permit the elimination of certain operations now required for the building of a bead and which will materially cut down the time required for other operations. A further object is to provide an improved bead structure which shall be simpler and more economical to manufacture than beads now employed in manufacturing pneumatic tire casings.

In the manufacture of beads for casings of the clincher type, heretofore it has been the practice to form the bead body of a hard rubber stock, cover the bead body with a rubberized fabric, semi-cure the fabric-covered bead body, usually at 70 pounds steam pressure for 30 minutes, buff the semi-cured, covered bead to give a good cementing surface, pass the buffed bead through a rubber cement, evaporate the solvent, cut to length and form a ring, and finally cover the ring with a rubberized fabric strip having one edge extending for an inch or more beyond the bead to form the so-called "flipper" which gives to the tire casing an increased stiffness contiguous to the beads. In the case of beads containing wire, a similar proceeding is involved in their fabrication.

I am enabled by the use of special thermoplastic compositions to construct a superior bead and at the same time to eliminate the step of semi-curing the bead and of buffing the fabric cover, when the latter is employed. The thermoplastic composition also makes possible the omission entirely of the bead cover since the composition itself offers a good cementing surface.

Of the accompanying drawing, Fig. 1 is a diagrammatic view of one embodiment of the apparatus employed in forming my new bead structure; Fig. 2 is a section of the bead as it comes from the embossing rolls of the calender; Fig. 3 is an elevation of the bead ring spliced by a tape winding; Fig. 4 is a section of the bead ring of Fig. 3 after the flipper has been applied and in condition to be built into a tire carcass; Figs. 5 to 9 are sectional views showing the successive steps in constructing a wire-containing bead according to the present invention; Fig. 10 is a sectional view of a modified structure of the bead shown in Fig. 9; and Figs 11, 12 and 13 are section views illustrating successive steps in building up a further modified bead construction.

The process of the present invention depends for its successful operation upon the use of a thermoplastic composition which has the requisite hardness at normal temperatures and yet may be calendered or tubed readily when warmed, and further presents a surface to which adhesives will bind firmly. I preferably employ a composition having as its essential ingredient certain substances prepared by reacting crude rubber under the influence of heat with various isomerizing agents for rubber, particularly compounds having the general formula $R-SO_2-X$, wherein R represents an organic radical or a hydroxy group and X represents a hydroxy group or chlorine, and including organic sulfonic acids, organic sulfonyl chlorides and sulfuric acid.

Substances of this character are described in an application filed by H. L. Fisher, Serial No. 758,099 now Patent No. 1,605,180 granted November 2, 1926. I have found the following to be especially practical and commercially satisfactory in the herein described processes: (1) the reaction product of p-phenol sulfonic acid, 7½ parts by weight, and rubber, 100 parts, when heated in a compact mass from 4 to 10 hours at 260–290° F., or reaction products in which the p-phenol sulfonic acid is replaced by any of the following; p-toluene sulfonyl chloride, 9 parts; p-toluene sulfonic acid, 7 parts; sulfuric acid, 4 to 5 parts; p-phenol sulfonic acid, 5 parts and sulfuric acid, 2 parts; or other sulfonic acids and acid sulfonyl chlorides or mixtures thereof, 5 to 9 parts. (2) A similar reaction product of 4 to 5 parts of concentrated sulfuric acid (sp. gr. 1.84) and crude rubber, 100 parts, with which is mixed from 2 to 50 parts of pine tar, when heated in a compact mass from 4 to 7 hours at 268° F.

The above products have been found upon analysis to contain mainly hydrocarbons having the same carbon and hydrogen ratio as rubber, and chemically less unsaturated than rubber. They are, therefore, generically isomers of rubber. They have a higher specific gravity than rubber, ranging from 0.970 to 1.005, and are freely plastic at relatively low temperatures. The term "Thermoprene" has been applied in the trade to these products and is used in the present specification for brevity and convenience of expression.

In the preparation of the composition for the bead body, I mix with the Thermoprene, 10 parts by weight, 50 to 60 parts of ground vulcanized scrap, 10 parts of mineral rubber and 20 parts of Dixie clay. This composition calenders and tubes satisfactorily and forms in the finished tire casing an uncured bead of satisfactory quality. A somewhat stronger bead is formed where sulfur 1.5 parts and calcium oxide 5 parts are added to the above compound, the added ingredients serving to cure or set the bead when the tire carcass is vulcanized. The above recipe is illustrative merely and I may employ a greater amount of Thermoprene, and in some cases even a smaller amount where increased amounts of softening agents are employed. The mineral rubber may be replaced in whole or in part by other softeners for rubber, such as soft tar, pine pitch, etc., the following recipe having been found to be especially practical: Thermoprene, 9 parts by weight, ground vulcanized scrap 55 parts, mineral rubber 9 parts, soft tar 6 parts, Dixie clay 15 parts, rubber preservative, 1 part, sulfur 1.5 parts and calcium oxide 5 parts.

Referring to the drawing, I show in Figs. 1 to 4 the successive steps employed in carrying out one embodiment of my invention. A thermoplastic bead composition 10 of the character described in the preceding paragraphs, is banked upon specially embossed hot rolls 11 and 12 of a calendar, which delivers a bead body 13 of continuous length, preferably of a cross section shown in Fig. 2. The bead body 13 is hot and consequently soft as it leaves the calender and may be passed through a cold water bath 14 to cool the bead and an air drier 15 to remove the surface film of water adhering thereto. The bead is then passed through a cement, as in the bath 16, preferably a solution of Thermoprene in an organic solvent, such as benzol, gasoline, etc., and then through another air dryer 17 which evaporates the solvent from the cement. The bead may now be wound helically upon a cylinder 18, cut on an element of the cylinder, the lengths spliced as by a tape winding 19, and the flipper 20 applied, the latter steps being performed in the usual manner.

Certain variations may be made in the process just outlined. A tubing machine may replace the calender. Where presses for curing beads are already installed, as in plants equipped for the old process of fabricating beads, the bead may be compacted and shaped by pressing for 2 minutes at 70 pounds steam. This is by no means an essential step but gives to the bead a smoother and cleaner-cut appearance. Further, the flipper may be applied to the bead before cutting and forming into rings and the flipper may be a rubberized fabric, or a sheeted Thermoprene stock similar to the bead body but preferably containing a minor proportion of fiber.

Where inextensible wire beads are to be formed, the braided or stranded wire 25 (see Figs. 5 to 8) is covered in a tubing machine, or otherwise, with a coating or insulation 26 of a vulcanizable Thermoprene composition of the character employed for forming the bead body of Figs. 1 to 4, and formed into a ring of two or more convolutions. Where the insulated wire braid is to be stored in rolls before building into beads, it may be coated with zinc stearate, or other powder absorbable in the Thermoprene, to prevent adhesion of the wire beads to each other, the zinc stearate being later removed by passing the insulated wire through an organic solvent or a thin Thermoprene cement. A calendered or tubed filler 27 of Thermoprene bead-body composition is formed and wrapped with the bead wire 25 in a fabric strip 28 preferably frictioned with Thermoprene or rubber, as shown in Figs. 6, 7 and 8, which fabric wrapped bead may be shaped in a mold. If the bead is stored at this stage of its manufacture, its adhesive character may be restored by dipping in a solvent, such as gasoline, or in a thin Thermoprene cement, and a flipper 29 applied in the usual manner. As shown in Fig. 10, the fabric wrap 28 and the flipper 29 may be replaced by a sheet 30 of a Thermoprene bead-body composition in which fibers may have been mixed to give it added strength.

A further modification of the wire bead is illustrated in Figs. 11, 12, and 13, in which a Thermoprene bead stock containing fibers is calendered or tubed to form a filler portion 31 and a wrapper portion 32. The surfaces to be folded in are coated with a Thermoprene cement and the wire braid 25 covered by folding the wrapping portion 32 about the filler portion 31, as indicated in the drawing.

In all of the processes above described, the economy effected in the number of operations required to make the bead and in the time required for similar operations, in comparison with the prior practice in constructing beads is very material, and the resulting bead has in addition the advantage of simplicity of construction.

I claim:

1. In the process of manufacturing a pneumatic tire casing having a bead member constructed to include a body portion of vulcanized composition, the steps which comprise shaping the body portion of the bead from a vulcanizable but unvulcanized composition which consists at least in part of Thermoprene and which is plastic at somewhat elevated temperatures but which possesses at normal temperatures a sufficient degree of hardness and strength to retain its shape under tire building conditions, incorporating in the carcass of the tire the unvulcanized bead, and thereafter simultaneously vulcanizing the vulcanizable portions of the bead and carcass.

2. In the process of manufacturing a pneumatic tire casing having a bead member constructed to include a body portion of vulcanized composition, and a fabric covering of the flipper type, the steps which comprise shaping the body portion of the bead from a vulcanizable but unvulcanized composition which consists at least in part of Thermoprene and which is plastic at somewhat elevated temperatures but which possesses at normal temperatures a sufficient degree of hardness and strength to retain its shape under tire building conditions, incorporating in the carcass of the tire the unvulcanized bead, and thereafter simultaneously vulcanizing the vulcanizable portions of the bead and carcass.

3. In the process of manufacturing a pneumatic tire casing having a bead member including a body portion of a vulcanized composition with a metallic reenforcement therein, the steps which comprise covering the metallic reenforcement with a vulcanizable but unvulcanized composition which consists at least in part of Thermoprene and which is plastic at somewhat elevated temperatures but which possesses at normal temperatures a sufficient degree of hardness and strength to retain its shape under tire building conditions, shaping the covered metallic reenforcement into an endless bead body, incorporating in the carcass of the tire the unvulcanized bead, and thereafter simultaneously vulcanizing the vulcanizable portions of the bead and carcass.

4. In the process of manufacturing a pneumatic tire casing having a bead member including a body portion of a vulcanized composition with a circumferential wire reenforcement therein, the steps which comprise covering the wire with a vulcanizable but unvulcanized composition which consists at least in part of Thermoprene and which is plastic at somewhat elevated temperatures but which possesses at normal temperatures a sufficient degree of hardness and strength to retain its shape under tire building conditions, assembling a plurality of convolutions of the covered wire into an endless bead body, incorporating in the carcass of the tire the unvulcanized bead, and thereafter simultaneously vulcanizing the vulcanizable portions of the bead and carcass.

5. In the process of manufacturing a pneumatic tire casing having a bead member including a body portion of a vulcanized composition with a circumferential wire reenforcement therein, the steps which comprise covering the wire with a vulcanizable but unvulcanized composition which consists at least in part of Thermoprene and which is plastic at somewhat elevated temperatures but which possesses at normal temperatures a sufficient degree of hardness and strength to retain its shape under tire building conditions, assembling a plurality of convolutions of the covered wire into an endless bead body, applying a flipper strip to the bead body, incorporating in the carcass of the tire the unvulcanized bead, and thereafter simultaneously vulcanizing the vulcanizable portions of the bead and carcass.

In witness whereof I have hereunto set my hand this 11th day of June, 1925.

WILLIAM C. GEER.